United States Patent
Mysore Vijaya Kumar et al.

(10) Patent No.: US 9,734,433 B1
(45) Date of Patent: Aug. 15, 2017

(54) ESTIMATING PHOTOMETRIC PROPERTIES USING A CAMERA AND A DISPLAY SCREEN

(71) Applicant: Amazon Technologies, Inc., Seattle, WA (US)

(72) Inventors: Rohith Mysore Vijaya Kumar, Sunnyvale, CA (US); Paul Aksenti Savastinuk, Shoreline, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 121 days.

(21) Appl. No.: 14/668,006

(22) Filed: Mar. 25, 2015

(51) Int. Cl.
G06K 9/20 (2006.01)
G06K 7/00 (2006.01)
G06K 9/62 (2006.01)
G06T 7/40 (2017.01)

(52) U.S. Cl.
CPC ......... G06K 9/6254 (2013.01); G06K 9/6263 (2013.01); G06T 7/408 (2013.01); G06T 2207/10152 (2013.01); G06T 2207/20081 (2013.01); G06T 2207/20144 (2013.01)

(58) Field of Classification Search
CPC ........ G01N 2021/557; G01N 2021/556; G06T 2207/10152
See application file for complete search history.

(56) References Cited

U.S. PATENT DOCUMENTS

| | | | | | |
|---|---|---|---|---|---|
| 6,134,339 | A | * | 10/2000 | Luo | G06K 9/00604 382/115 |
| 2005/0094895 | A1 | * | 5/2005 | Baron | H04N 5/2354 382/275 |
| 2014/0023237 | A1 | | 1/2014 | Basso et al. | |
| 2014/0372075 | A1 | * | 12/2014 | Kojima et al. | G01B 11/00 702/167 |
| 2015/0193920 | A1 | * | 7/2015 | Knee et al. | H04N 5/243 382/154 |

FOREIGN PATENT DOCUMENTS

JP 2009128345 * 6/2009 .......... G01N 21/956

OTHER PUBLICATIONS

Achanta, et al. SLIC Superpixels. EPFL Technical Report No. 149300, Jun. 2010.

(Continued)

*Primary Examiner* — Brian P Werner
(74) *Attorney, Agent, or Firm* — Pierce Atwood LLP

(57) ABSTRACT

A system determines what regions in a scene captured by a camera include highly reflective (specular) surfaces. The system illuminates the scene by outputting images to a display screen such as a television screen so as to illuminate the scene from different angles. Images of the scene are captured by the camera under the different illuminations. The images are analyzed to determine which regions in the scene exhibit changes in reflected luminance that correspond to the changes in illumination, indicating a specular surface. Regions containing diffuse surfaces are also identified based on such regions exhibiting a reflected luminance that is substantially independent of the changes in illumination.

20 Claims, 11 Drawing Sheets

(56) References Cited

OTHER PUBLICATIONS

Boykov, et al. Markov Random Fields With Efficient Approximations. International Conference on Computer Vision and Pattern Recognition, 1998.
Criminisi, et al. Extracting Layers and Analyzing Their Specular Properties Using Epipolar-Plane-Image Analysis. Computer Vision and Image Understanding, vol. 97, No. 1, pp. 51-85, 2005.
Garg, et al. The Dimensionality of Scene Appearance. Computer Vision, IEEE 12th International Conference, pp. 1917-1924, 2009.
Jin, et al. Mumford-Shah on the Move: Region-Based Segmentation on Deforming Manifolds With Application to 3-D Reconstruction of Shape and Appearance From Multi-View Images, pp. 1-25, 2007.
Oren, et al. Generalization of the Lambertian Model and Implications for Machine Vision. International Journal of Computer Vision, vol. 14, No. 3, 1996.
Tan, et al. Separating Diffuse and Specular Reflection Components Based on Surface Color Ratio and Chromaticity. IAPR Workshop on Machine Vision Applications, pp. 14-19, 2002.
Wexler, et al. Bayesian Estimation of Layers From Multiple Images. Computer Vision—ECCV, Springer Berlin Heidelberg, pp. 487-501, 2002.
Woodham. Photometric Method for Determining Surface Orientation From Multiple Images. Optical Engineering, vol. 19, No. 1, pp. 139-144, 1980.
Zhang, et al. Photorealistic 3D Volumetric Model Reconstruction by Voxel Coloring. IAPRS, vol. 38 No. 3b, pp. 92-97, 2010.
Zhou, et al. Separation of Reflection Component by Fourier Decoupling. Proceedings of the Asian Conference on Computer Vision, pp. 1-6, 2004.

\* cited by examiner

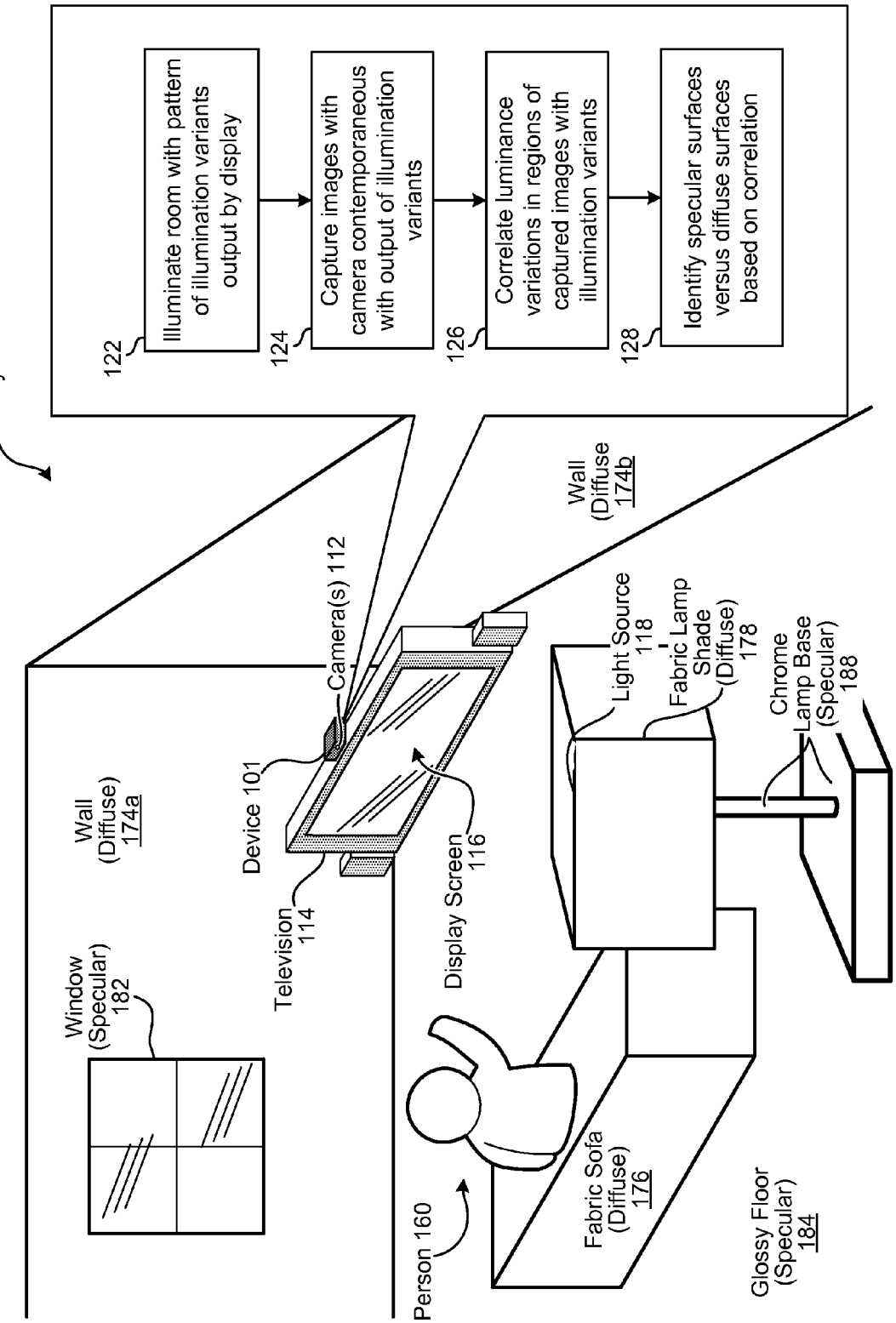

Display 116 — Dark Region 234 — Bright Region 332 — Illumination Variant 330a

Display 116 — Dark Region 234 — Bright Region 332 — Illumination Variant 330b

Display 116 — Dark Region 234 — Bright Region 332 — Illumination Variant 330c

Display 116 — Dark Region 234 — Illumination Variant 330d — Bright Region 332

Display 116 — Dark Region 234 — Illumination Variant 330e — Bright Region 332

Display 116 — Bright Region 332 — Illumination Variant 330f — Dark Region 234

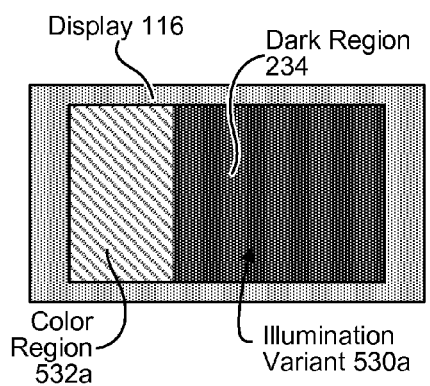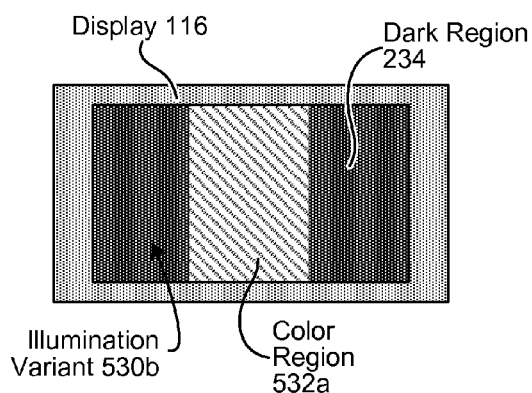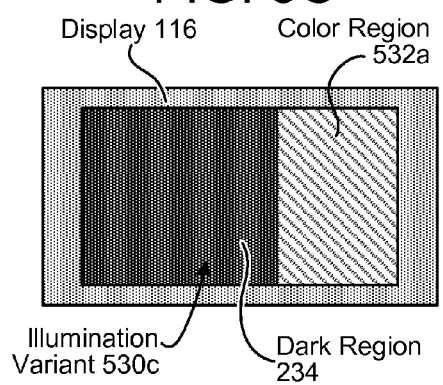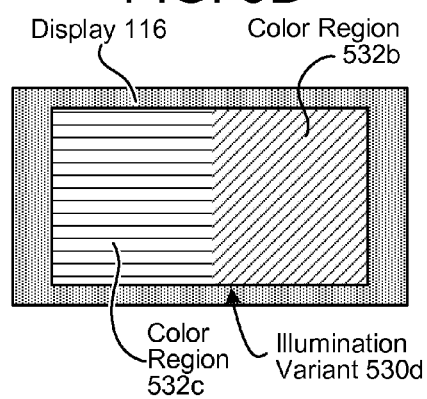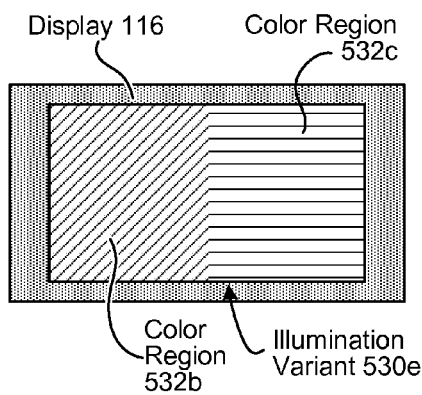

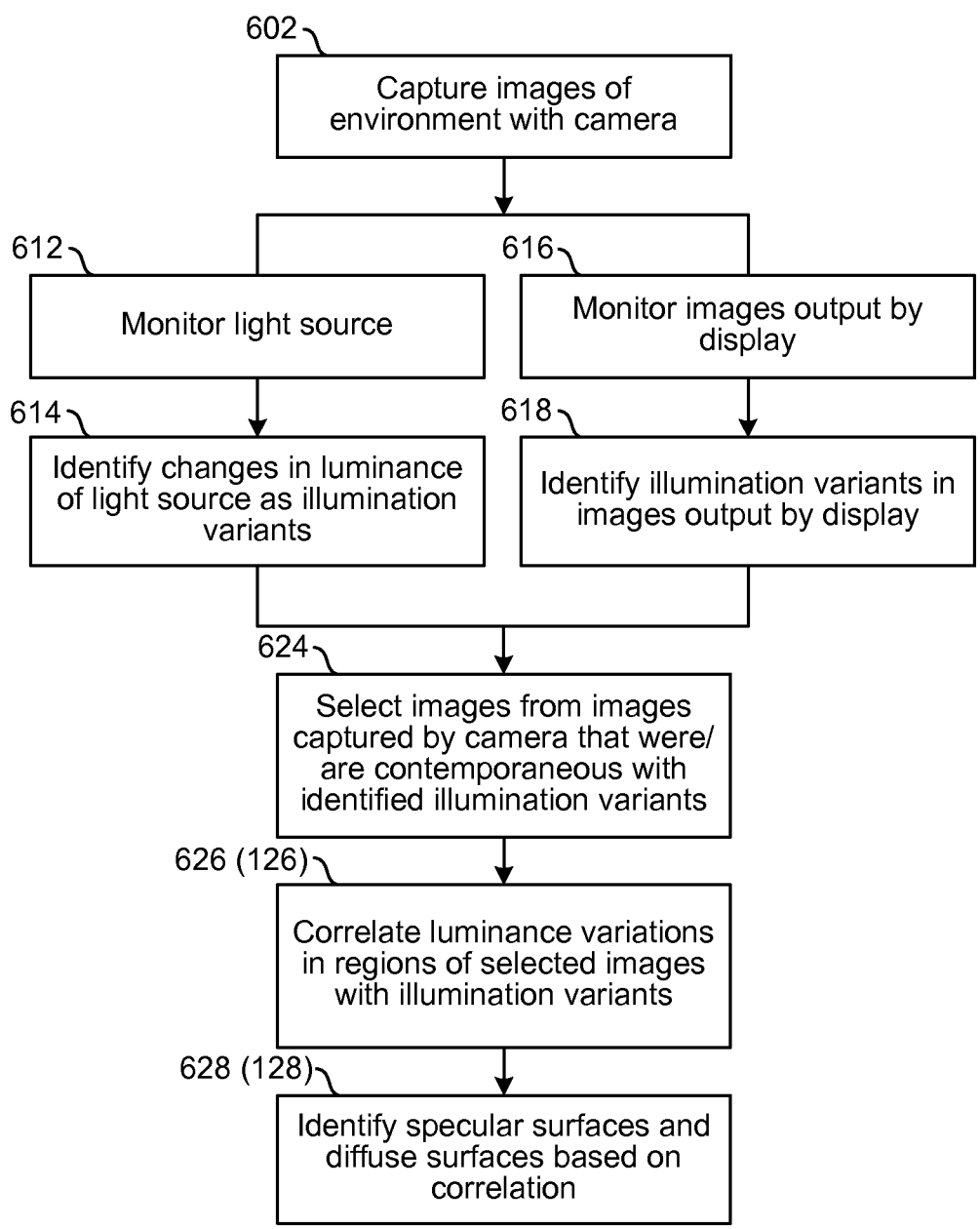

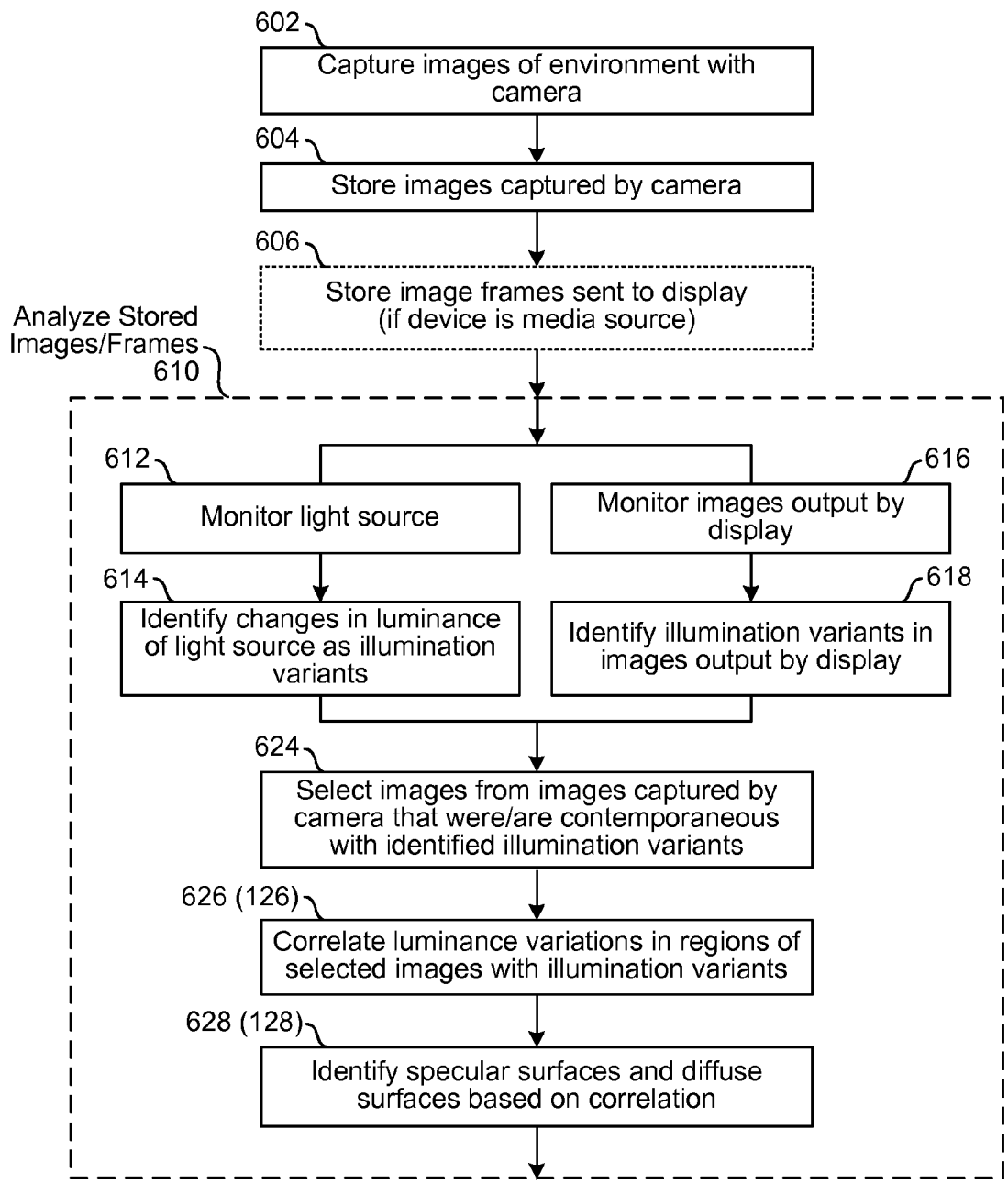

ESTIMATING PHOTOMETRIC PROPERTIES USING A CAMERA AND A DISPLAY SCREEN

BACKGROUND

Object identification and tracking systems, such as face recognition and tracking systems, identify areas of a scene captured by a camera that correspond static background features that do not change over time. Identifying these static background features allows such systems to focus image analysis on areas of a captured scene where changes in captured images occur over time. Narrowing the focus of what features in an image should be analyzed as potential objects of interest (e.g., faces) reduces computational complexity associated with image analysis and reduces the time it takes to identify the objects.

BRIEF DESCRIPTION OF DRAWINGS

For a more complete understanding of the present disclosure, reference is now made to the following description taken in conjunction with the accompanying drawings.

FIG. 1 illustrates a system for identifying specular surfaces in a room using a camera and a display screen.

FIGS. 5A to 5E illustrate further examples of illumination variants of a pattern used to identify the specular surfaces and other photometric properties of surfaces in the room.

FIG. 6A illustrates example steps of a process to passively identify illumination variants being output by a display for identifying specular surfaces in a room using a camera and the display screen.

FIG. 6B illustrates example steps of a process to store images and later passively identify illumination variants of a pattern used to identify the specular surfaces and other photometric properties of surfaces in the room.

DETAILED DESCRIPTION

Figure 2A:
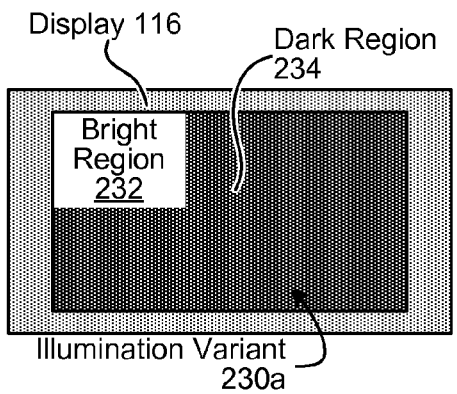
FIGS. 2A to 2F illustrate examples of illumination variants of a pattern output by the display screen to identify the specular surfaces in the room.
Figure 2B:
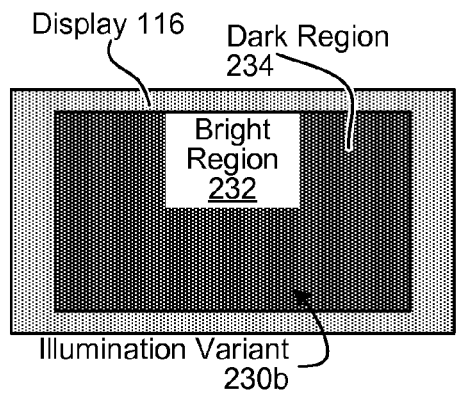
Figure 2C:
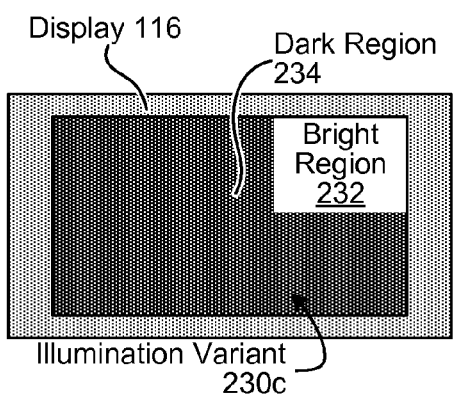
Figure 2D:
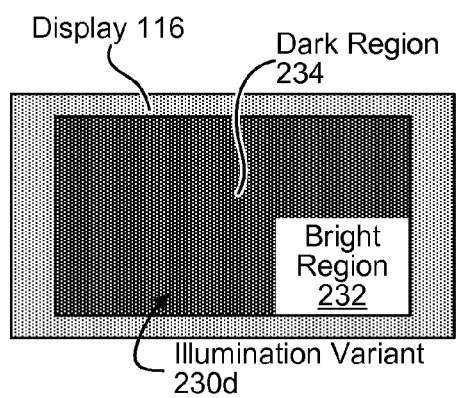
Figure 2E:
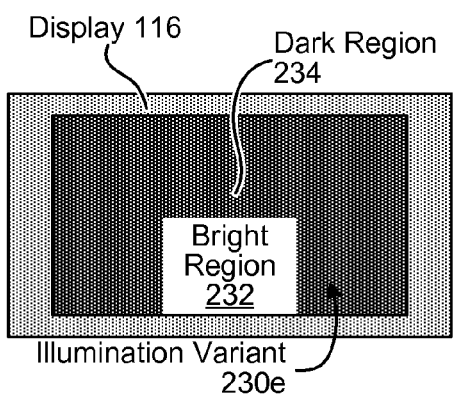
Figure 2F:
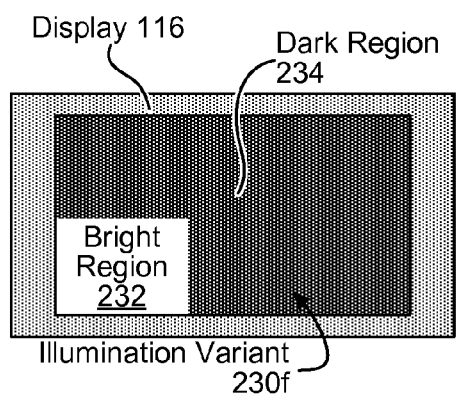
Figure 3A:
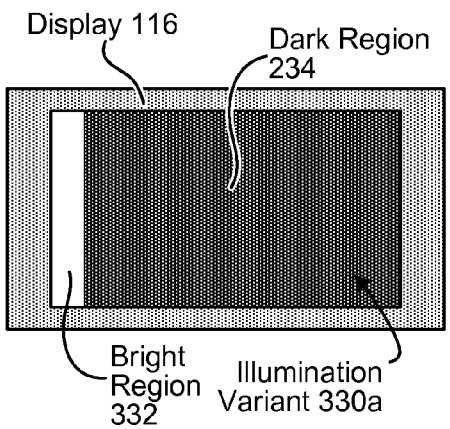
FIGS. 3A to 3I illustrate further examples of illumination variants of a pattern used to identify the specular surfaces in the room.
Figure 3B:
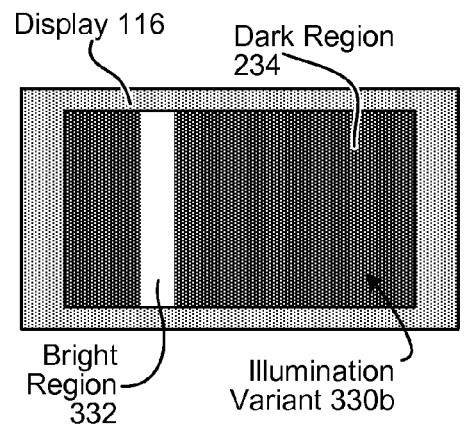
Figure 3C:
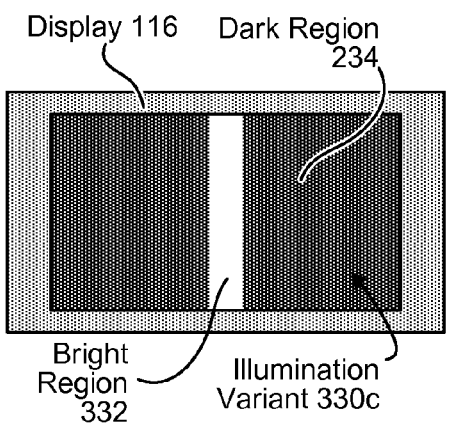
Figure 3D:
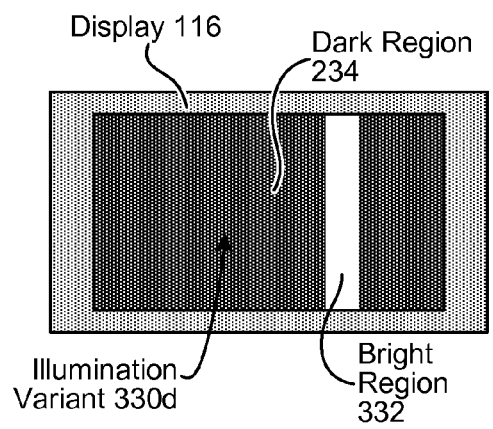
Figure 3E:
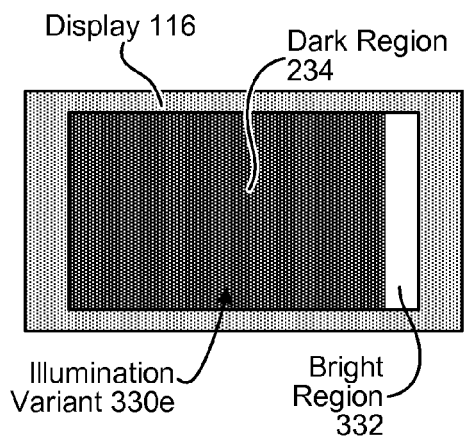
Figure 3F:
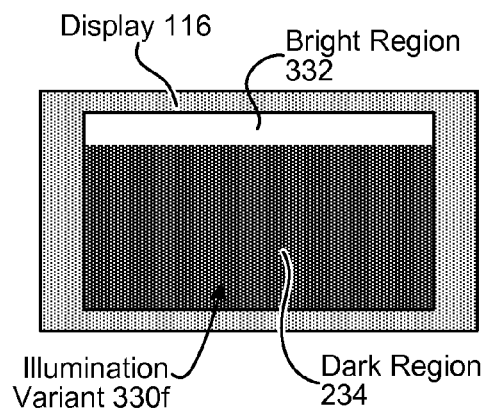
Figure 3G:
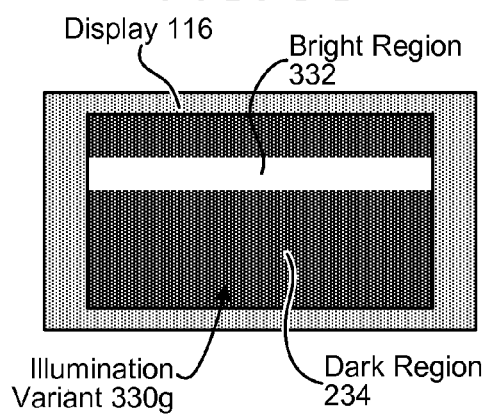
Figure 3H:
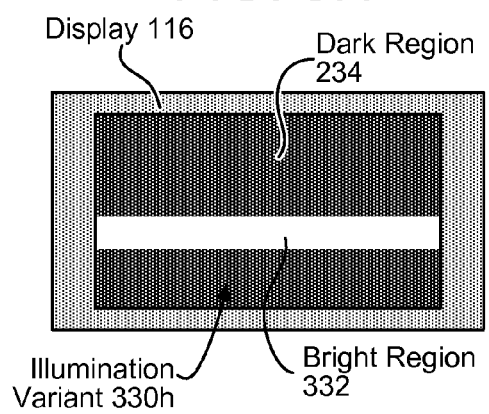
Figure 3I:
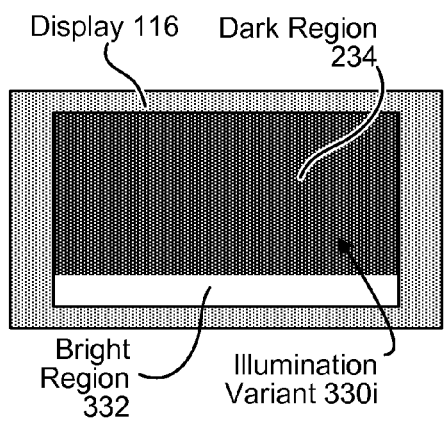

Decomposition of an image into background and foreground regions is one of the preliminary steps used in fixed-camera image analysis systems for scene monitoring. Foreground regions contain objects of interest in a scene, such as animate objects that may be monitored and tracked (e.g., people, pets, etc.) and inanimate objects that are newly added (e.g., an abandoned bag in an airport). Background regions typically include stationary features in a captured scene.

Being able to differentiate between foreground and background regions in an image has many uses. For example, when tracking a foreground object such as a face, background regions may be subtracted from the image or ignored as a preliminary step during image processing to reduce computational complexity. As another example, in video image transmission and reproduction, background regions may be rendered using a static model, reusing a single static model to reconstruct the background regions for multiple frames, reducing the quantity of data needed to render a scene. As a further example, in video telephony, an image of the room behind a caller identified as one or more background regions may be removed and replaced (similar to chroma key compositing, also known as green-screen compositing), substituting a different background scene behind the caller (the caller being a foreground object).

The presence of a foreground object in a scene, on its own, can be used to flag events and/or it can be used to localize the regions for further processing such as object classification and tracking. Reliable detection of foreground regions serves to increase accuracy and decrease processing time in scene monitoring systems.

Appearance-based detection of foreground objects and background regions is often performed under the assumption of a purely Lambertian scene model. There are multiple ways of modeling the background such as models that utilize Gaussian distributions or multiple Gaussian distributions. Lambert's model is used extensively in such computer vision systems. There also some other techniques which identify specified higher order features, such as characterizing local texture patterns and things like that. But each of these techniques assume that different parts of a scene are not interacting with each other. As a result, a Lambertian model can be inaccurate, misidentifying background regions as foreground regions.

A Lambertian scene model relies on background regions containing diffuse surfaces, where the reflective properties of a surfaces are independent of the point-of-view of the viewer (e.g., dull surfaces that exhibit "Lambertian" reflectance). Diffuse surfaces exhibit a low "shininess," where zero shininess corresponds to no reflection of a perfectly diffuse surface and one corresponds to perfect reflection.

One source of error when using Lambertian modeling to differentiate foreground and background regions in an image is the misidentification of surfaces that exhibit specular reflection as foreground regions. Specular surfaces are characterized by shininess, producing reflections that change with a viewer's point-of-view. Examples of surfaces in a typical indoor scene that exhibit specular reflection include window panes, mirrors, glassy/polished objects, chrome, and glossy surfaces.

Depending on context, many specular surfaces should be characterized as background regions. However, from the fixed point of view of a scene monitoring system, changes in the reflections off of specular surfaces may cause the surfaces to be misidentified as foreground regions, as specular surfaces do not satisfy the diffuse surface assumption that underlies Lambertian scene modelling.

Unable to differentiate specular surfaces, foreground object tracking algorithms produce false positives resulting from specular reflections. For example, failure to account for presence of specular surfaces may lead to false foreground detections and inaccurate foreground boundaries near such objects. As another example, in low ambient room light, movement of objects outside a window may be mistaken for foreground objects in the room, and in high ambient room light, reflections of objects inside the room off the window glass may be misidentified as foreground objects.

If a map providing locations and boundaries of such specular surfaces were available, image processing systems could selectively filter those regions to improve the accurate detection and tracking of foreground objects around and passing in front of these regions to improve scene decomposition accuracy. However, the manual creation of such a map by a scene-monitoring-system end user is a tedious process and does not make for a good user experience.

FIG. 1 illustrates a system 100 including a device 101 that uses one or more cameras 112 and a display screen 116 to build a photometric map of a scene by determining the shininess characteristics of objects within the camera's field of view. The scene within the camera's field of view includes both foreground regions and background regions. Although the point-of-view of the camera(s) 112 may be fixed, the device 101 uses the display screen 116 of the television 114 to create a moving light source to illuminate the room from different angles. By monitoring changes in the reflected light reaching the camera(s) 112 from surfaces in the room as the pattern emitted by the display screen changes, specular regions become distinguishable from diffuse regions.

In FIG. 1, the foreground regions include a person 160. In this example, everything else in the room is background. The background regions include both diffuse (low shininess) and specular surfaces (high shininess). Examples of diffuse surfaces include the walls 174a and 174b, the fabric sofa 176, and the fabric lamp shade 178. Examples of specular surfaces include the window 182, the glossy wood floor 184, and the chrome base 188 of the lamp.

A surface may be characterized by, among other metrics, shininess and albedo. However, while shininess and albedo both characterize surface characteristics related to reflectivity, they are distinctly different concepts. Albedo is the diffuse reflectivity of a surface, depends upon frequency/color, and is quantified as the fraction of incident light that a surface reflects. In comparison, shininess quantifies specular reflectivity of a surface, and is independent of color. For example, a white piece of ordinary (i.e., non-glossy) paper and white fabric lamp shade 178 have a high albedo, they exhibit a low shininess (i.e., low specularity, high diffusiveness). As another example, a glossy black floor 184 has a low albedo unless it is reflecting light from another source directly at the camera, but has a high shininess (i.e., high specularity, low diffusiveness). That the glossy black floor 184 may sometimes register as having a high albedo if it is directly reflecting light at the camera exhibits one of the shortcoming of existing Lambertian models.

The device 101 may use any light source in a room that it is able to monitor and/or control to build a photometric map of the scene. For example, using the display screen 116, the device 101 may illuminate (122) the room with a known pattern of illumination variants (such as a sequence of bright flashes interspersed with dark intervals). A camera(s) 112 captures (124) images of the room while the illumination patterns are output. The output illumination patterns are then correlated (126) with the observed luminance variations in various regions of the images captured by the camera(s) 112 to detect photometric properties.

Based on the correlations, the device 101 identifies (128) which regions in the camera's field of view contain specular surfaces and which regions contain diffuse surfaces. Regions exhibiting a direct correlation between changes in luminance variation and changes in illumination variant ordinarily correspond to specular surfaces with higher shininess, whereas those exhibiting little variation may be lower shininess diffuse surfaces or surfaces that are turned away from display screen 116.

Regions may be identified using multiple passes of segmentation algorithms. A pass may identify "connected components" corresponding to groups of contiguous pixels sharing the same photometric properties (e.g., exhibiting the same or similar changes of luminance variations in response to changes in illumination variants). As additional reflected luminance information becomes available, these grouping of pixels may be refined to better identify borders between regions having different shininess.

Identifying (128) differences in surfaces may be based on a broad level classification of specular versus Lambertian surfaces. From the intensity of the reflected light, changes in intensity versus changes in incident illumination may be determined, providing a first level of classification. A trained classifier may be used to classify surfaces, trained by providing the classifier training sets including surfaces at different angles and different shininess exposed to illumination at different angles. Lambertian "shape from shading" techniques may then be applied and/or photometric stereo analysis techniques may be applied. Photometric stereo is a technique in computer vision systems for estimating the surface normal of objects by observing that object under different lighting conditions. The "normal" of a surface is a line or vector that is perpendicular to that surface (geometry). Stereo images typically uses two cameras separated by a disparity between them to create a three-dimensional model. In comparison, with photometric stereo, a single camera can be used to view a scene, but the position of the light is changing to create multiple images.

Using shape shading and/or photometric stereo, structural and textural information can be determined from the collected images. Among other information that can be determined is the orientation of the specular surfaces based on calculated surface normals, further refining the available information about specular surfaces. Such information may also be used to further refine and resegment the regions of contiguous pixels exhibiting the specular properties.

As images may contain many things that are very close in appearance most of the time, applying a segmentation algorithm on a single pass will typically produce regions that are coarse and/or inaccurate. For example, if a small portion of a window is visible and behind the window is an object such as a neighbor's or part of a fence that is roughly the same color as an object between the window and the camera(s) 112 inside, single-pass segmentation is usually inadequate to pick out the separate parts of the scene looking at a single image.

Using scalable units, the first segmentation pass may break down the dimension to regular groups of uniform grids, uniform blocks of a certain number of pixels. An additional step may be determine image segments which contain contiguous pixels grouped together based on appearance (i.e., connected components). So, for example, there the window and the objects around the window might come out as one segment if there is insufficient contrast difference between them to separate out the difference objects from a single image.

However, having additional information about the specularity and surface orientation of the different surfaces, segmentation accuracy improves, providing much tighter boundaries defining regions forming different parts of the scene. After segmenting the regions, noise within the region may be reduced or removed (to avoid processing noise at every pixel stage). Segments may then be grouped into neighborhood units to facilitate scalable processing, with further boundary refinement applied to create accurate boundaries around object and regions. Referring to the window example, the final segments will have a much tighter border around the window identifying it as a specular region versus the rest of the regions which would be marked out as Lambertian surfaces (assuming they are not reflective as well).

Surface normals may be determined by collecting images under known varying illuminations ("illumination variants") from a fixed camera 112 (either through "active" illumination changes controlled by the device 101 and/or "passive" illumination changes detected by the device 101). The images together with illumination information are processed through multiple algorithms to obtain the surface normals. The final objective of the algorithms is to identify regions of an image with similar radiometric characteristics (hereafter called segments) and estimate albedo, specularity and surface orientation for these segments.

Initially, the images are divided into smaller regions (hereafter called windows). These windows are obtained either through regular grids or superpixel algorithms, such as those disclosed by Radhakrishna Achanta, Appu Shaji, Kevin Smith, Aurelien Lucchi, Pascal Fua, and Sabine Siisstrunk in "SLIC Superpixels," Ecole Polytechnique Federale de Lausanne (EPFL) Technical Report no. 149300, published June 2010. These windows are created to decrease the complexity of processing and reduce noise through aggregation of observations.

Specular windows can be separated from Lambertian windows using correlation of observed chromaticity and incident lighting, using algorithms such as those disclosed by Robby T. Tan, Ko Nishino, and Katsushi Ikeuchi in "Separating Diffuse and Specular Reflection Components Based-on Surface Color Ratio and Chromaticity," MVA 2002, IAPR Workshop on Machine Vision Applications, Nara, Japan, pages 14 to 19, Dec. 11-13 2002.

A specular surface under white light will lead to saturated spots which appear nearly white, whereas a colored Lambertian surface will still retain its color even when the incident lighting is strong. Reflections can be separated out based on the frequency components of the images involved, using algorithms such as those disclosed by Wei Zhou and Chandra Kambhamettu in "Separation of Reflection Component by Fourier Decoupling," Asian Conference on Computer Vision, Jeju Island, Korea, pages 1 to 6, Jan. 27-30, 2004.

Surface normals (which indicate orientation of a given surface) of Lambertian windows are then estimated using photometric stereo techniques such as those disclosed by Robert J. Woodham in "Photometric method for determining surface orientation from multiple images," Optical Engineering, Volume 19, No. 1, pages 139 to 144, January-February 1980.

The observed luminance of a Lambertian surface "I" depends on the dot product of the surface normal "N" and the lighting direction "L". The constant of proportionality will depend on albedo of the surface and the camera gain in accordance with Equation 1:

$$I \propto N \cdot L \quad [1]$$

The camera gain can be estimated using the metadata information from camera 112. Multiple values of "L" are (which is the lighting direction vector) and corresponding values of "I" are determined through observation of several illumination variants. This produces a set of linear equations of the form $I_1 = \text{Albedo} \cdot N \cdot L_1$, $I_2 = \text{Albedo} \cdot N \cdot L_2$, ... etc. Factorization methods may then be used to solve for Albedo and N. Thus, having captured several images under different lighting directions, the normal and the albedo can be solved for using linear factorization algorithms.

Once the properties of each window are identified, multiple neighboring windows may be combined to form segments. This can be achieved through region growing algorithms or globally optimal algorithms such as graph cuts, such as the algorithms disclosed by Yuri Boykov, Olga Veksler and Rabin Zabih in "Markov Random Fields with Efficient Approximations," International Conference on Computer Vision and Pattern Recognition (CVPR), 1998.

Having identified which regions contain specular surfaces and which regions contain diffuse surfaces, a map of the room is generated. The map may include scalable and/or non-scalable boundaries defining regions, and information for each region characterizing the region as diffuse, specular, or some degree there between, and providing surface normal for the regions. Boundaries of the specular regions may be refined by determining areas of the images that share similar local image characteristics such as color and edges. The values assigned to a region characterizing its specularity may, for example, be a value approximating its shininess based on the degree of interdependence between the variations in luminance from the region and the variations in illumination from the display 116. The map is then used by image processing routines to better identify and track foreground objects, such as facial recognition and tracking routines, object recognition and tracking routines, area surveillance and motion detection routines, etc.

Such processing routinely uses maps generated by Lambertian scene modelling to identify foreground and background objects, but without the ability to distinguish luminance changes in a specular background region from movement in a foreground region. The new maps add the ability to correctly and autonomously identify specular surfaces as background regions, and the orientation of these surfaces. When motion is detected in a diffuse region, it is much more likely to be a foreground object than when motion is detected in a specular region (particularly if the motion originates in the specular region, as compared to being tracked to there).

The number of illumination variants and images captured for preparation of the map may vary. Fewer images may be used in "active" mode as compared to passive mode, since in active mode, the device 101 has control of the screen 116 and can fine tune the lighting variations to produce the most distinct results. In "passive" mode, since the content of the frames is not under the control of the device 101, more frames may need to be collected. Regions may be assigned shininess values, with the shininess values refines as more images are collected and correlated.

The shininess values may be based on, among other things, a difference between the brightest luminance recorded from a region in response to an illumination variation and the smallest luminance recorded from the region in response to an illumination variation. One or more shininess thresholds may be used to characterize a region as shiny or not shiny, such characterizing regions as "specular" and "not specular" in the photometric map. If a shininess value is above the threshold, it is characterized as specular—otherwise it is characterized as diffuse.

Photometric stereo data may be assembled in part by decomposing the observed color of surfaces (as incident light and surface color) under various illuminations. For example, specular and diffused characteristics may be further identified using illumination having different colors, repositioning the illumination to capture reflections at different angles. The device 101 may display patterns of different colors on the display screen 116 to distinguish and identify surfaces by their color reflectance properties. How a surface diffuses different colors at different angles can provide information about higher order features of the surface, such as local texture patterns. Combining photometric stereo techniques with illumination provided by moving regions of color on the display 116, surface normals can be identified, as well as the directions in which the surface normals are pointed in the room so that the type of reflections to be expected from the surface can be anticipated. For example, based on the position of the camera(s) 112, the surface, and the direction of the normal to that surface, ray tracing can be used to analyze movement in a region containing a specular surface, to determine whether the movement is a reflection (tracing the ray to the source) or whether movement coincides with a foreground object passing in front of the specular region.

Another possible use for the improved photometric map is to apply dynamic modeling to calculate the geometry of the room, as well as the speed an unidentified blob is moving. Using conventional techniques, room geometry may be determined based on vanishing points, working from an assumption that walls are usually parallel or at right angles to each other. Assuming a box orientation to the room and applying edge detection, an approximate geometry of the room may be calculated. Additionally, gradient domain techniques may be applied to separate out reflections, which may be used to determine if there are two overlapped images in a region (e.g., a specular surface and a reflection off of the specular surface) versus a single image.

By determining the origin of movement, a model may be built of angles of a region to project where a reflection is expected. If a reflection is expected from an identified specular surface, tracking algorithms may shift analysis to where the object that is the origin of the image is expected to be (or appear). While the object may not yet be in the camera's field of view, the tracking algorithm may then prioritize analysis of changes that later appear in that area of an image for analysis as a foreground object.

A detection and tracking algorithm may detect movement in a specular region that never transitions to a diffuse region. In such circumstances, the detection and tracking algorithm may be configured not to identify the region where the movement is detected as a foreground region (i.e., to reject the detected motion as a false-positive caused by a specular surface).

Other light sources may be used as an alternative to or in addition to the display screen 116. For example, if the lamp's light source 118 is a "smart" bulb that the device 101 can control, in "active" mode the device 101 can turn the lamp on and off while capturing images at a same time, correlating (126) luminance in the captured images with other illumination variants. The light source 118 may be turned on while the display 116 is set to be dark, and vice-versa, to maximize the difference in angles of illumination. In the alternative, if the light source 118 is not controllable by the device 101 but the lamp is within the field of view of the camera(s) 112, images captured before the light is turned on may be compared with images captured after to correlate (126) the luminance variations with illumination variant (i.e., the device 101 operating in "passive" mode).

It is not essential to know the exact position of a light source 118 illuminating a captured scene, but modelling is more accurate if the orientation of the light source 118 and the spectrum of light that it produces in a captured image are determined. A coarse level of detail is sufficient, such as determining whether a light source 118 is a spotlight versus a television screen versus a fluorescent lamp, and whether it is above, below, behind, etc. the camera(s) 112. A color spectrum for a light source 118 may be determined based on the change in ambient lighting when the light source is on and when the light source is off. This color spectrum may be compared to stored spectra to determine the type of light (e.g., fluorescent, incandescent, etc.). Existing image analysis techniques may be used to determine if the light source 118 is directional, focused, omni-directional, etc., and if directional, the direction the light source is facing, based on edge analysis in the captured images following the change in the ambient lighting when the light is turned on and off.

If the television 114 or monitor including the display screen 116 has a camera or cameras 112 built in, the position of the camera versus the position of the display is fixed and known. But the device 101, the camera(s) 112, and the display screen 116 may physically separate. At least the camera(s) 112 and the display screen 116 and/or other light sources 118 need to have sufficient proximity that changes in luminance produced by the display screen 116 and/or light sources 118 are within the field of view of the camera(s) 112.

Determining a direction a display screen 116 and/or a light source 118 is facing may be based on shadows and gradients of light, and flat areas of light, in the captured images. For example, viewing a wall 174, there is a gradient in the lighting varying from light to dark, darkening with distance from the light source. Also, once specular regions are identified and their surface normal determined, ray tracing may be used to determine the origin of light reflected off of the specular surfaces.

The orientation of the display screen 116 relative to the camera(s) 112 may be determined by creating a point light on one side of the screen and then moving the point of light from left to right. Based on movement of shadows in the captured images as the position illuminated on the screen changes, a determination can be made as to the location and orientation of the display screen 116.

The device 101 may engage in both active and passive modes of surface mapping. An active mode of mapping surfaces comprises the device 101 controlling the pattern of illumination variants output by the display 116. A passive mode of mapping surfaces comprises the device monitoring the patterns output by the display without controlling them.

FIGS. 2A to 2F illustrate an example of a pattern that may be used for active mapping. Each illumination variant 230a to 230f includes a brightly illuminated shape or region 232 (e.g., a white region) on a dark background (dark region 234). The bright region 232 is moved to different locations across the display screen 116 to provide a moving source of illumination.

FIGS. 3A to 3I illustrate another example of a patter that may be used for active mapping, each illumination variant 330a to 330i includes a brightly illuminated shape or region 332 (e.g., a horizontal or vertical white stripe across the screen) on a dark background (dark region 234). The bright region 332 is moved vertically and horizontally across the display screen 116 to provide a moving source of illumination.

By changing the position of the bright region 232/332, illumination reflects directly and indirectly off surfaces of objects in the room at different angles. These reflections are captured (124) by the camera 112, with the device 101 using the captured images to correlate (126) variations in luminance with the time-varying illumination pattern output by the display screen 116.

Figure 4:
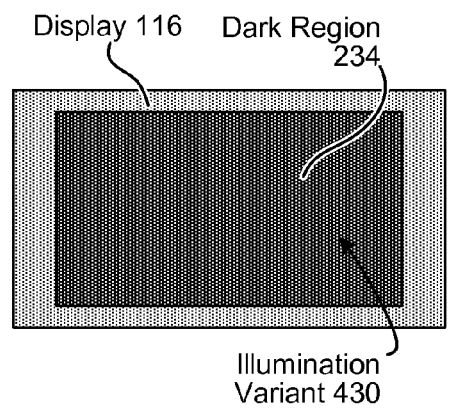
FIG. 4 illustrates an example of an illumination variant that may be used with the patterns illustrated in FIGS. 2A to 3I.

FIG. 4 illustrates another example of illumination variant included in the patterns. This image variation 430 consists entirely of the dark region 234 and may be output by the display 116 to provide a baseline for room illumination. This baseline illumination variant 430 may be output before, after, and/or in-between the other illumination variants 230/330. The image data captured by the camera 112 while this "baseline" image variation 430 is output may, for example, be subtracted from image data captured for the other illumination variants 230/330 to simplify identification of regions exhibiting luminance variation in response to movement of the bright regions 232/332.

FIGS. 5A to 5E illustrate another example of illumination variants in which a color region or regions 532 is output from various positions of the display 116. In FIGS. 5A to 5C, the dark region 234 provides contrast for a color region 532a, whereas in FIGS. 5D and 5E, multiple color regions 532 are output at a same time (532b and 532c in FIG. 5D, 532b and 532c with positions reversed in FIG. 5E). Iterations of the variations 530a to 530e may change the color of the color region(s) 532. Variations in luminance in regions of captured images coinciding with the variations and sequence of colors may be used both to identify specular surfaces, and with photometric stereo techniques to identify surface normal and other textures. Differences in light of different colors may also be used to distinguish surface properties of objects, such as distinguishing which surfaces share common properties, which surfaces differ, and the presence of shadows. Also, when captured image contain moving objects, illuminating the environment with more than one color is advantageous, as more information about the object may be captured simultaneously (since the foreground object's profile will change as it moves).

In comparison to the examples of illumination variants in FIGS. 2A to 5E in an active mode, in a passive mode the device 101 monitors the content output by the display 116, such as a television show or movie being displayed by the television 114, and other changes in lighting. The device 101 identifies illumination variants in the images output by the display screen 116, etc., and correlates the illumination variants in the image with changes in the light reflected toward the camera 112 by surfaces in the room. The device 101 may determine what is being output by the display screen 116 by direct observation using the camera 112, and/or by directly or indirectly accessing the video signal that is being output.

FIG. 6A illustrates example steps providing an overview of passive mode operation. The device 101 captures (602) images of the environment using the camera 112. The device monitors (612) the light source 118, identifying (614) changes in luminance of the light source 118 as illumination variants. The device also monitors (618) the images output by the display, and identifies (618) illumination variants in the output images. For example, the device may identify an illumination variant based on a video frame including areas exhibiting large differences in contrast across the image in a single frame, where the differences in contrast between areas exceeds a contrast threshold, and where each area exceeds a minimum area threshold (e.g., a contiguous area exceeding a minimum percentage of the image frame).

The device 101 selects (624) images with the camera(s) 112 coinciding with identifies illumination variants. The device 101 may discard other images. If the device 101 is directly determining illumination variants by monitoring the environment using the camera, then the image including the illumination variant may also be selected (624) as the image exhibiting environment luminance. However, if the device 101 is not using the camera to identify illumination variants from the display, but is instead analyzing a video media signal, then there may be a latency between identifying illumination variants and when those variants are actually output by the display.

If indirectly monitoring the display, the device may determine this latency periodically, such as comparing the luminance in captured images preceding an image in the monitored video media going dark (e.g., the screen going black as a program "blanks" between advertisements, scenes, etc.), where the time difference between the reduction or increase in reflected luminance and the identification of the illumination variation (e.g., a transition in screen contrast from high to low or low to high) is the latency. Various factors may contribute to latency, such as the processing time to identify illumination variations and latency introduced by the device accessing the video program in a different manner than the television 114. However, in some circumstances it may be unnecessary to determine latency, such as if the video program is being provided to the television/display by the device 101, and illumination variants are identified prior to outputting the video frame introducing variant to the display 116.

Determining which images to select and which images to discard may be based in part upon the latency, depending upon how the device 101 is monitoring (616) the images output by the display. Auto correlation techniques may be used to align which captured images correspond to an identified change in illumination. For example, a time regression may be applied to a sequence of captured (602) images to align the sequence with the identified change in illumination, with images retained and discarded accordingly.

In comparison, in active mode, although images may also be continually captured and selectively selected or discarded, since the timing of when a variations in illumination is to be output and the duration of each variation is known, the images captured by the device 101 may be timed to be contemporaneous with output of an illumination variant (e.g., an image is captured at some point during the duration that the illumination variant is output by the display).

The passive process then continues as discussed in connection with FIG. 1, correlating (126/626) luminance variations in regions of the selected images with illumination variants and identifying (128/628) specular surfaces and diffuse surfaces based on the correlations.

Operating in passive mode, images may be captured for later analysis. For example, the device 101 may capture (602) images of the environment while a user is interacting with the device 101, and build and store the photometric map later when the device is otherwise idle. Such an arrangement is illustrated in FIG. 6B. The device 101 captures (602) the images of the environment with the camera 112. The images are stored (604) for later analysis. If the media program that is being output by the display 116 is provided via the device 101, the device 101 may also store (606) image frames sent to the display. Later, the device 101 analyzes (610) the stored images and frames, comprising steps 612 through 628 in FIG. 6B.

Figure 7:
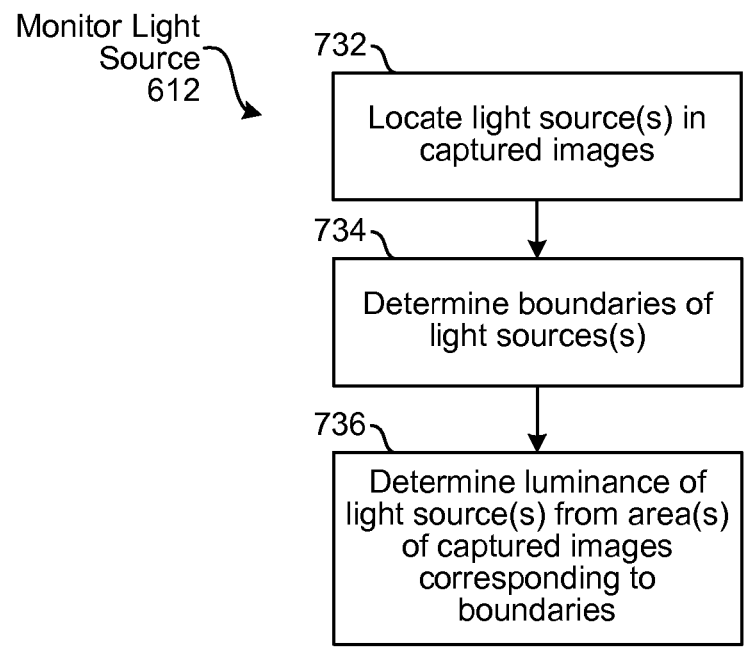
FIG. 7 illustrates further process steps that may be used to passively identify illumination variants output by a light source.

FIG. 7 illustrates a process by which the device 101 may passively monitor (612) the light source 118. The device 101 locates (732) the light source(s) in the captured image. When a light source is located, the device 101 determines (734) the boundaries of the light source(s) within the captured image (e.g., determining which pixels in the captured images correspond to a location of a light source). The device may then determine (736) the luminance of the light source(s) from the area(s) of the captured images corresponding to the boundaries of the light source(s).

As referred to above, several different approaches may be used by the device 101 operating in passive mode to monitor (616) the images output by the display 116. For example, if the video program being output by the display 116 is passing through the device 101, the device may directly monitor the frames of the video. As with active mode, since the image content being output is known, the screen 116 used by the device 101 need not be directly visible in the camera 112.

However, in passive mode, if the image content being output by the display is not known, the device 101 may use the camera 112 to monitor (616) the images being output by the display.

Figure 8:
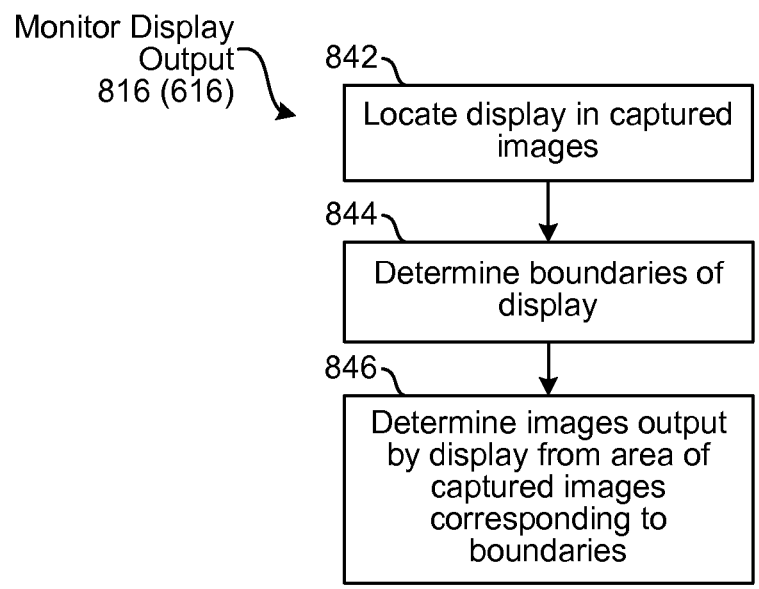
FIG. 8 illustrates further process steps that may be used to passively identify illumination variants output by a display.

FIG. 8 illustrates a camera-based passive method 816 that may be used by the device 101 to monitor (616) the display. The camera(s) 112 are used to locate (842) the display 116 in captured images. The display may be identified by searching a sequence of images for a geometric region that contains a changing, flickering light pattern that periodically goes dark (e.g., blanking between scenes or advertisements). A determination (844) is made to identify the boundary of the display as an area of the camera's field of view. The device 101 then monitors the defined boundary to determine (846) images output by the display.

Figure 9:
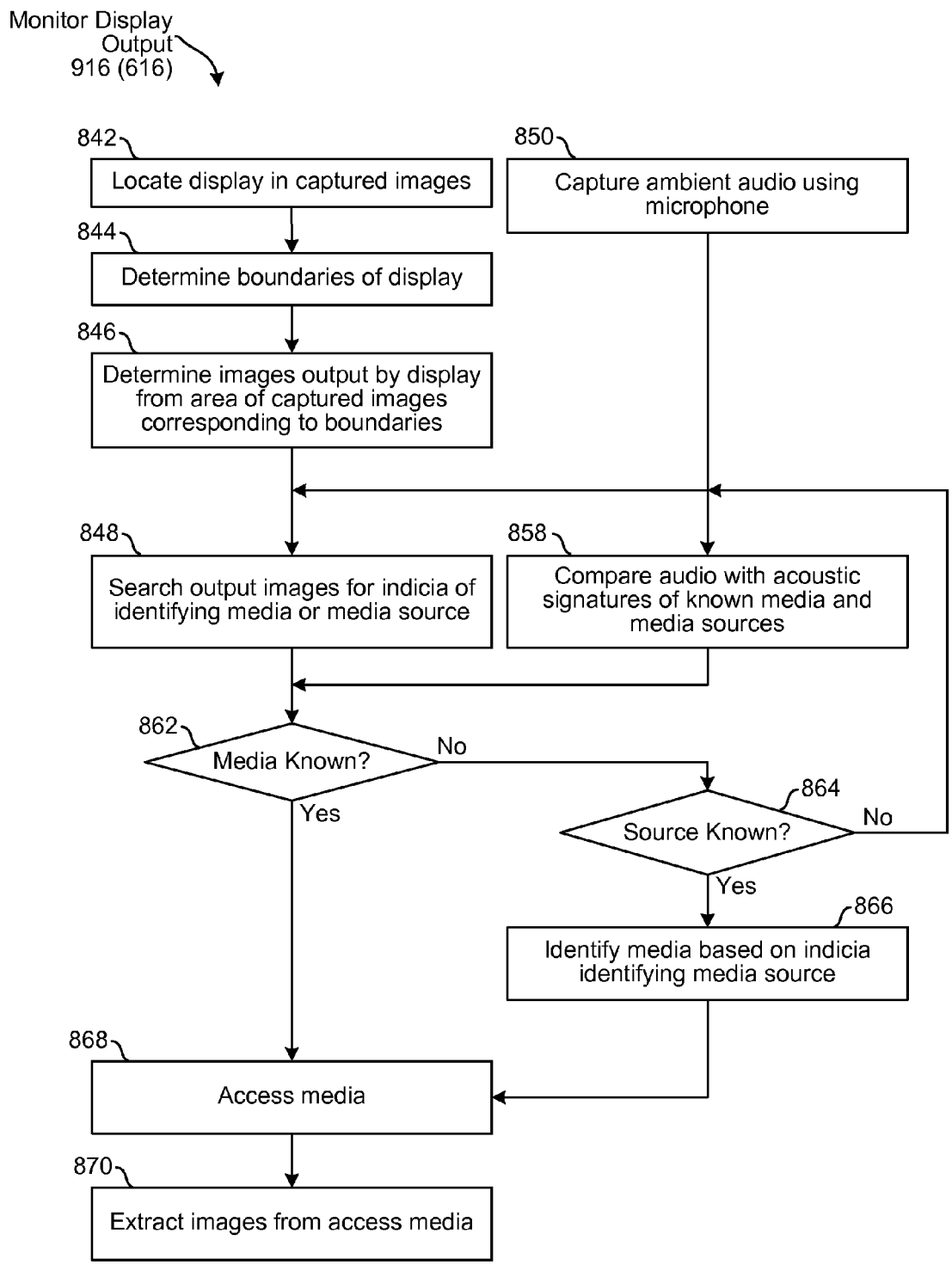
FIG. 9 illustrates further process steps that may be used to passively identify illumination variants based on the media output by a display.

FIG. 9 illustrates another camera-based method 916 by which the device 101 may monitor (616) the display. As illustrated in FIG. 8, the device 101 locates (842) the display, determines (844) the boundaries of the display, and determines (846) images output by the display within from the area of the captured images within those boundaries.

The device 101 searches (848) the image for identifiable indicia identifying the media or the media source. For example, the device 101 may search the lower right corner of the display for a television network logo. The device 101 may also compare the image with light patterns of known media segments, such as the title segment at the beginning of a television show, new program, or movie.

The device may also monitor 850 ambient audio using one or more microphones. If the direction of the camera and the microphones are fixed relative to each other, sound localization techniques may be used to focus monitoring of audio that originates from the direction of the display, as identified in 842. The device compares (858) the captured audio with known acoustic signatures, such as the theme music associated with a particular television show or title sequence.

When the video media program is not known (862 "No") but indicia of a source is found (864 "Yes"), the device identifies (866) the media based on the indicia of the media source. For example, a television programming guide may be accessed to identify the program that a television network or channel is airing. If neither the media (862 "No") nor the media source (864 "No") are known, the device 101 may keep search (returning to 848 and 858 to search more images/audio).

Having identified the programming (862 "Yes" or via 866), the device 101 may independently access (868) either the same media source (as indicated by the indicia), an equivalent source, or a stored copy of that media programming. For example, if the display 116 is outputting a broadcast network television program, but the device 101 is geographically remote from display 116 (e.g., connected to the camera(s) 112 via a network), the media source that is accessed may be a different affiliate of the same broadcast network showing the same program. Via the accessed media, the device extracts (870) images from the media. After extraction, the images are processed to identify illumination variants in the images (618 in FIGS. 6A and 6B). Once illumination variants for a media program are known, time indexes and illumination characteristics of each illumination variant may be cached on a network connected device (e.g., a server providing "cloud" service) so that the next time a device 101 accesses the same media program, the illumination variants may be identified by accessing the cached data.

Figure 10:
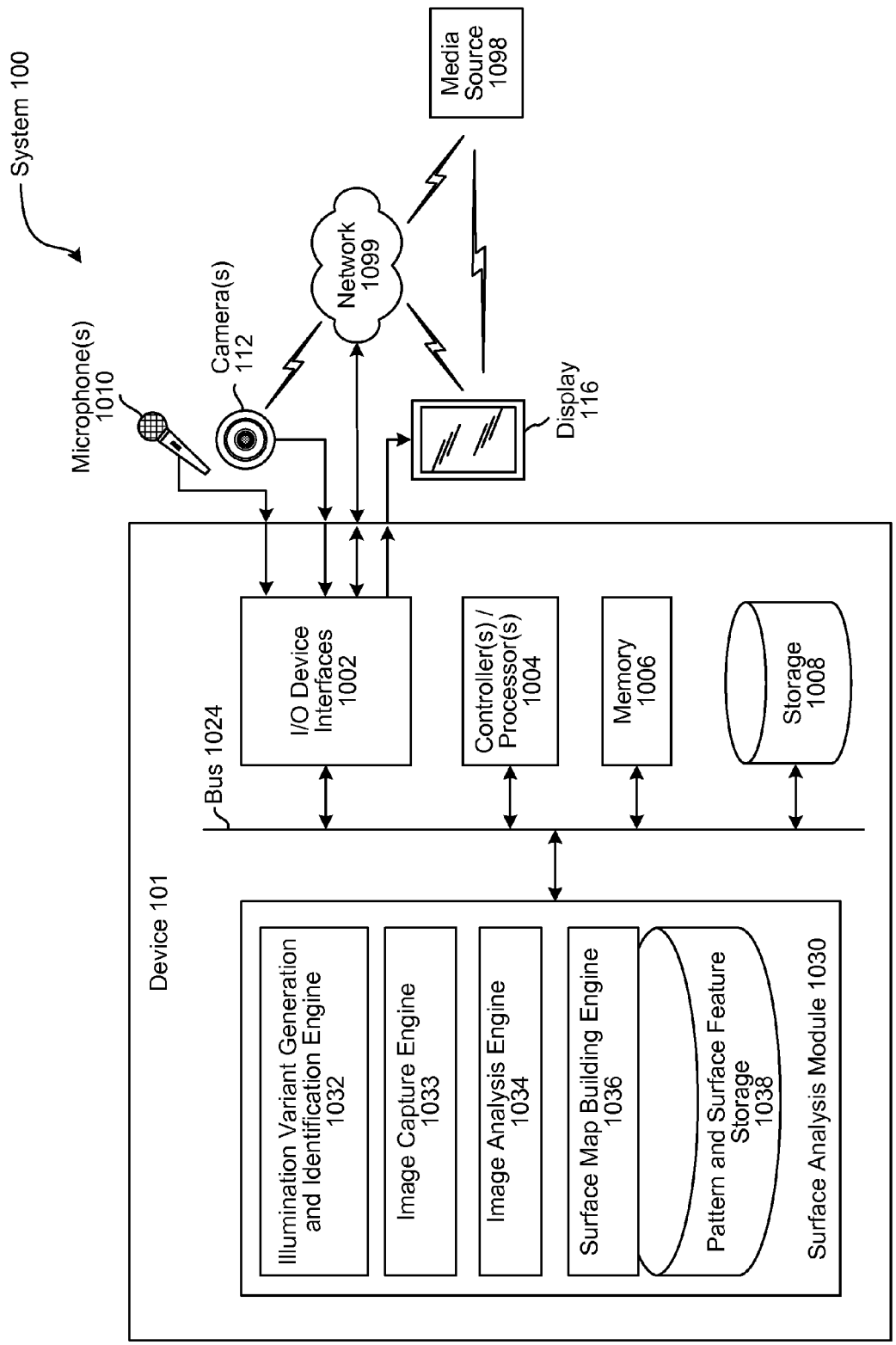
FIG. 10 is a block diagram conceptually illustrating example components of the system for identifying specular surfaces in the room.

FIG. 10 is a block diagram conceptually illustrating example components of the system 100 including the device 101, the camera(s) 112, the display screen 116, and microphone(s) 1010. In operation, the system 100 may include computer-readable and computer-executable instructions that reside on the device 101, as will be discussed further below.

As illustrated in FIG. 10, the device 101 may be connected to one or more image capture device(s), such as a camera(s) 112, either directly or via a network 1099. The device 101 may also be connected to the display 116, either directly or via a network 1099.

The system 100 may also include one or more media sources 1098. The device 101 and/or the display 116 (e.g., television 114) may access the media source either directly, through the network 1099, or via another communications channel. A media source 1098 may be the source of images output by the display 116 when operating in passive mode. The media source 1098 used by the device 101 to capture images may be the same media source connected to the display 116, or may be an equivalent but different parallel source (e.g., another source for the same programming being shown by the display 116, such as the same broadcast signal from a different broadcast affiliate).

A media source 1098, the camera(s) 112, the microphone(s) 1010, and/or the display 116 may be integrated as components within the device 101 or may be separate.

The device 101 may include an address/data bus 1024 for conveying data among components of the device 101. Each component within the device 101 may also be directly connected to other components in addition to (or instead of) being connected to other components across the bus 1024.

The device 101 may include one or more controllers/processors 1004, that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The device 101 may also include a data storage component 1008, for storing data and controller/processor-executable instructions (e.g., instructions to perform the processes illustrated in FIGS. 1 and 6-8). The data storage component 1008 may include one or more non-volatile storage types such as magnetic storage, optical storage, solid-state storage, etc. The device 101 may also be connected to removable or external non-volatile memory and/or storage (such as a removable memory card, memory key drive, networked storage, etc.) through the input/output device interfaces 1002.

Computer instructions for operating the device 101 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The device 101 includes input/output device interfaces 1002. A variety of components may be connected through the input/output device interfaces 1002, such as the microphone(s) 1010, the display 116 and the camera(s) 112. The input/output device interfaces 1002 may also include an interface for an external peripheral device connection such as universal serial bus (USB), FireWire, Thunderbolt or other connection protocol. The input/output device interfaces 1002 may also include a connection to one or more networks 1099 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1099, the system 100 may be distributed across a networked environment, as will be discussed further below with FIG. 11.

The device 101 further includes a surface analysis module 1030 that correlates luminance variations with illumination variants to produce a photometric surface map that identifies specular surfaces. The module 1030 includes an illumination variant generation and identification engine 1032. In active mode, the illumination variant generation and identification engine 1032 outputs illumination variants via the display 116, such as those illustrated in FIGS. 2A to 5E, based on data stored in module storage 1038. The illumination variant generation and identification engine 1032 may also control the light source 118. In passive mode, the illumination variant generation and identification engine 1032 monitors (612/616/816/916) and identifies (614/618) illumination variants output by the display and/or light source.

An image capture engine 933 captures images of a room or scene using the camera(s) 112. An image analysis engine 1034 may determine the latency between changes in illumination and changes in luminance, select captured images that are contemporaneous with the change in luminance (e.g., 124, 624), and correlate (126/626) luminance variations in regions of captured images with illumination variants to identify (128/628) specular surfaces. A surface map building engine 1036 refines boundaries of regions based on shared photometric characteristics and outputs a map identifying which regions correspond to specular surfaces. The map may be built combing data from both active-mode detection of specular surfaces and passive-mode detection of specular surfaces, such as using passive mode data based on illumination variants produced by the light source 118, and using active mode data based on illumination variant images output to the display 112, such as those in FIGS. 2A to 5E. The map may be used by other processes (e.g., detection and recognition software executed by the controller(s)/processor(s) 1004) to identify and track foreground objects.

The processes associates with the foreground object detection and recognition software and how specular surface information is utilized may vary by use case. For example, a system that performs surveillance in areas may be configured to detect any and all movement, and/or to detect the presence of inanimate objects that are out of place. For instance, if monitoring a concourse at an airport and someone abandons a bag, the system may identify the bag as a foreground object when it is the camera's direct line of sight, but identify a bag visible in a reflection as background, since in the case of a reflection, the captured reflection may be of a bag that remains near its owner. However, if monitoring someone's living room, a dropped bag might be identified as a foreground object when moving, and as a background object once stationary. Thus, the definition of foreground and background depends upon the use case. In most every case, the processes that identify and analyze foreground objects may treat objects that may be reflections and objects that cross specular regions differently from other objects.

A storage element 1038 of the module 1030 stores data for the patterns output in active mode, and surface feature data used to construct the map and which may be refined over multiple iterations of the process. Classifier models that may be used by an image classifier of the image analysis engine 1034 to classify regions may also be stored in storage 1038. Storage 1038 may be dedicated non-volatile storage, may comprise a portion of memory 1006 and/or storage 1008, or some combination thereof. The storage element may also cache time indexes and illumination characteristics of each illumination variant for identified media.

The concepts disclosed herein may be applied within a number of different devices and computer systems, including, for example, general-purpose computing systems, multimedia set-top boxes, televisions, server-client computing systems, video telephony computing systems, laptop computers, etc.

Figure 11:
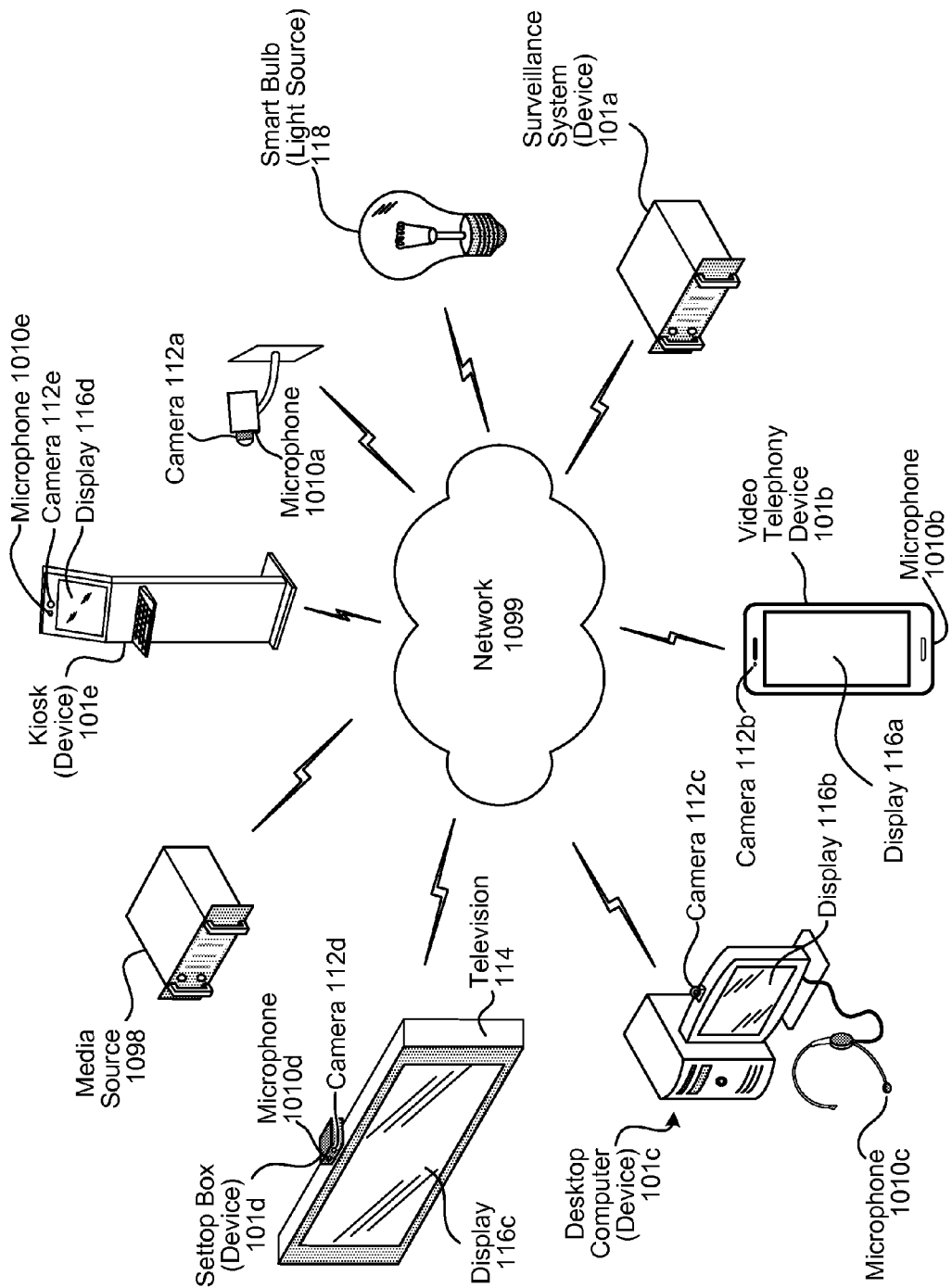
FIG. 11 illustrates an example of a computer network for use with the system.

As illustrated in FIG. 11, multiple devices (101a-e, camera 112a, smart bulb 118, media source 1098) may contain components of the system 101 and the devices may be connected over a network 1099. Network 1099 may include a local or private network or may include a wide network such as the internet. Devices may be connected to the network 1099 through either wired or wireless connections. For example, a smart bulb 118, a video telephony device 101b, and a camera 112a may be connected to the network 1099 through a wireless service provider, over a WiFi or cellular network connection or the like. Other devices, such as a surveillance system server 101a, a desktop computer 101c, a set-top box 101d, and a media source 1098 may connect to the network 1099 through a wired connection. Networked devices may capture and output video and images through a number of video capture devices and illumination devices, such as capturing images from one or more of cameras 112a to 112e capturing portions of a same scene, and displays 116a to 116d and light source 118 illuminating portions of a same scene. These image capture and output devices may be connected to networked devices either through a wired or wireless connection. Likewise, audio may be captured through microphones 1010a to 1010e. Networked devices may also include embedded image input devices and output devices, such as an internal camera 112b and display 116a integrated in video telephony device 101b, a camera 112d integrated in settop box 101d, and camera 112e and display 116d integrated in the kiosk 101e.

In certain system configurations, one device may capture images and identify reflected luminesce variations in those images, another device may control illumination, and yet another device may determine luminance-illumination correlations and identification of specular surface. Because image analysis may involve significant computational resources, in terms of both storage and processing power, such split configurations may be employed where the device (e.g., 101b) has lower processing capabilities than a remote device (e.g., 101a). Which devices perform which tasks may vary for a single process flow, such as a first device 101 performing image capture (602) and monitoring (612/616), a second device 101 performing illumination variant identification (612/614), the first device 101 selecting images (624), correlating (626) the images, and identifying (628)

specular surfaces, a fourth device 101 building the map, and then an application on the first device 101 using the map.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, video surveillance, photometric stereo analysis, and Lambertian image analysis should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of surface analysis module 1030 may be implemented as firmware or as a state machine in hardware. For example, at least the illumination variant generation portion of the illumination variant generation and identification engine 1032 may be implemented as an application specific integrated circuit (ASIC), and the image analysis engine may be implemented in part as a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    configuring a display to output a first image comprising a bright white region on a first portion of the first image screen, with a remainder of the first image being dark, wherein the first image as output from the display illuminates an environment;
    capturing a second image of a portion of the environment within a field-of-view of a camera, as the portion of the environment is illuminated by the first image output by the display;
    configuring the display to output a third image comprising the bright white region on a second portion of the third image, with the remainder of the third image being dark, wherein the third image as output from the display illuminates the environment;
    capturing a fourth image of the portion of the environment within the field-of-view of the camera, as the portion of the environment is illuminated by the fourth image output by the display;
    determining that a first region within the field-of-view of the camera includes a specular surface based on a first difference in luminance from the first region as captured in the second image and luminance from the first region as captured in the fourth image exceeds a threshold value;
    determining that a second region within the field-of-view of the camera includes a diffuse surface based on a second difference in luminance from the second region as captured in the second image and luminance from the second region as captured in the fourth image not exceeding the threshold value;
    capturing a third image and a fourth image of the portion of the environment within the field-of-view of the camera; and
    comparing changes between the third and fourth image to identify motion within the field-of-view of the camera, excluding changes in the first region.

2. The method of claim 1, further comprising determining boundaries of the first region by identifying contiguous areas of the second image that exhibit similar first local image characteristics and contiguous areas of the fourth image that exhibit similar second local image characteristics, wherein the first and second local image characteristics include color and edges.

3. A computing device comprising:
    at least one processor; and
    a memory including instruction operable to be executed by the at least one processor to perform a set of actions to configure the at least one processor to:
        select a first image of a portion of an environment within a field-of-view of a camera as the portion of the environment is illuminated with a first illumination variant, the first illumination variant illuminating the environment at a first angle;
        select a second image of the portion of the environment within the field-of-view of the camera as the portion of the environment is illuminated with a second illumination variant, the second illumination variant illuminating the environment at a second angle that is different from the first angle of the first illumination variant;
        identify a first region that exhibits a first luminance in the first image and exhibits a second luminance in the second image, a first difference between the first luminance and the second luminance exceeding a threshold value;
        determine that the first region includes a specular surface based on the first difference exceeding the threshold value;
        capture a third image and a fourth image of the portion of the environment within the field-of-view of the camera; and
        compare changes between the third and fourth image to identify motion within the field-of-view of the camera, excluding changes in the first region.

4. The computing device of claim 3, wherein the instructions further configure the at least one processor to:
    output a first frame providing the first illumination variant to a display to illuminate the environment, the first frame to produce a bright area on a first portion of the display and a dark area on a second portion of the display; and
    output a second frame providing the second illumination variant to the display to illuminate the environment, the second frame to produce the dark area on the first portion of the display and the bright area on the second portion of the display.

5. The computing device of claim 3, wherein the instructions further configure the at least one processor to:

communicate with a light source to turn the light source from off to on to illuminate the environment, wherein the first illumination variant corresponds to the light source being on; and output a first frame providing the second illumination variant to a display to illuminate the environment, the second frame to produce a bright area on the display.

6. The computing device of claim 3, wherein the instructions further configure the at least one processor to:
monitor a display;
determine that the display is outputting a first video frame providing the first illumination variant; and
determine that the display is outputting a second video frame providing the second illumination variant.

7. A computing device comprising:
at least one processor; and
a memory including instruction operable to be executed by the at least one processor to perform a set of actions to configure the at least one processor to:
select a first image of a portion of an environment within a field-of-view of a camera as the portion of the environment is illuminated with a first illumination variant, the first illumination variant illuminating the environment at a first angle;
select a second image of the portion of the environment within the field-of-view of the camera as the portion of the environment is illuminated with a second illumination variant, the second illumination variant illuminating the environment at a second angle that is different from the first angle of the first illumination variant;
identify a first region that exhibits a first luminance in the first image and exhibits a second luminance in the second image, a first difference between the first luminance and the second luminance exceeding a threshold value;
determine that the first region includes a specular surface based on the first difference exceeding the threshold value;
receive video content;
output the video content to a display;
monitor the display;
determine that the display is outputting a first video frame providing the first illumination variant;
select the first video frame based on differences in contrast between areas of the first video frame exceeding a contrast threshold, the first video frame including a first bright area on a first portion of the first video frame and a first dark area on a second portion of the first video frame;
determine that the display is outputting a second video frame providing the second illumination variant; and
select the second video frame based on differences in contrast between areas of the second video frame exceeding the contrast threshold, the second video frame including a second bright area on a second portion of the second video frame and a second dark area on a first portion of the second video frame.

8. A computing device comprising:
at least one processor; and
a memory including instruction operable to be executed by the at least one processor to perform a set of actions to configure the at least one processor to:
select a first image of a portion of an environment within a field-of-view of a camera as the portion of the environment is illuminated with a first illumination variant, the first illumination variant illuminating the environment at a first angle;
select a second image of the portion of the environment within the field-of-view of the camera as the portion of the environment is illuminated with a second illumination variant, the second illumination variant illuminating the environment at a second angle that is different from the first angle of the first illumination variant;
identify a first region that exhibits a first luminance in the first image and exhibits a second luminance in the second image, a first difference between the first luminance and the second luminance exceeding a threshold value;
determine that the first region includes a specular surface based on the first difference exceeding the threshold value;
monitor a display;
determine that the display is outputting a first video frame providing the first illumination variant;
determine that the display is outputting a second video frame providing the second illumination variant; and
locate the display by identifying a geometric area outputting a flickering luminance within the portion of the environment within the field-of-view of a camera.

9. A computing device comprising:
at least one processor; and
a memory including instruction operable to be executed by the at least one processor to perform a set of actions to configure the at least one processor to:
select a first image of a portion of an environment within a field-of-view of a camera as the portion of the environment is illuminated with a first illumination variant, the first illumination variant illuminating the environment at a first angle;
select a second image of the portion of the environment within the field-of-view of the camera as the portion of the environment is illuminated with a second illumination variant, the second illumination variant illuminating the environment at a second angle that is different from the first angle of the first illumination variant;
identify a first region that exhibits a first luminance in the first image and exhibits a second luminance in the second image, a first difference between the first luminance and the second luminance exceeding a threshold value;
determine that the first region includes a specular surface based on the first difference exceeding the threshold value;
monitor a display;
determine that the display is outputting a first video frame providing the first illumination variant;
determine that the display is outputting a second video frame providing the second illumination variant;
identify first video content being output by the display; and
access second video content corresponding to the first video content, a first source of the first video content and a second source of the second video content being different,
wherein the instructions to determine that the display is outputting the first video frame configure the at least one processor to determine the first video frame based on the second video content, and the instructions to determine that the display is outputting the second video frame configure the at least one processor to determine the second video frame based on the second video content.

10. The computing device of claim 9, wherein the instructions to identify first video content being output by the display configure the at least one processor to:
   capture audio using a microphone; and
   identify the first video content based on the captured audio.

11. The computing device of claim 3, wherein the first illumination variant is produced by a first frame output by a display and the second illumination is produced by a second frame output by the display, the instructions further configure the at least one processor to:
   select a third image of the portion of the environment within the field-of-view of the camera while the display goes dark during a third frame, the third frame providing a third illumination variant; and
   compare differences in luminance between the first image and the third image, and between the second image and the third image to isolate changes in luminance caused by the display.

12. The computing device of claim 3, wherein the instructions further configure the at least one processor to:
   identify a second region that exhibits a third luminance in the first image and exhibits a fourth luminance in the second image, a second difference between the third luminance and the fourth luminance not exceeding the threshold value; and
   determine that the second region includes a diffuse surface based on the second difference not exceeding the threshold value.

13. The computing device of claim 3, wherein the instructions further configure the at least one processor to:
   determine a first vector that is normal to the first region based on the first luminance, the second luminance, a first lighting direction from which the first illumination variant illuminates the environment, and a second lighting direction from which the second illumination variant illuminates the environment at the different angle from the first lighting direction.

14. A non-transitory computer-readable storage medium storing processor-executable instructions for controlling a computing device, the instructions to configure the computing device to:
   select a first image of a portion of an environment within a field-of-view of a camera as the portion of the environment is illuminated with a first illumination variant, the first illumination variant illuminating the environment at a first angle;
   select a second image of the portion of the environment within the field-of-view of the camera as the portion of the environment is illuminated with a second illumination variant, the second illumination variant illuminating the environment at a second angle that is different from the first angle of the first illumination variant;
   identify a first region that exhibits a first luminance in the first image and exhibits a second luminance in the second image, a first difference between the first luminance and the second luminance exceeding a threshold value;
   determine that the first region includes a specular surface based on the first difference exceeding the threshold value;
   capture a third image and a fourth image of the portion of the environment within the field-of-view of the camera; and
   compare changes between the third and fourth image to identify motion within the field-of-view of the camera, excluding changes in the first region.

15. The non-transitory computer-readable storage medium of claim 14, wherein the instructions further configure the computing device to:
   output a first frame providing the first illumination variant to a display to illuminate the environment, the first frame to produce a bright area on a first portion of the display and a dark area on a second portion of the display; and
   output a second frame providing the second illumination variant to the display to illuminate the environment, the second frame to produce the dark area on the first portion of the display and the bright area on the second portion of the display.

16. The non-transitory computer-readable storage medium of claim 14, wherein the instructions further configure the computing device to:
   communicate with a light source to turn the light source from off to on to illuminate the environment, wherein the first illumination variant corresponds to the light source being on; and
   output a first frame providing the second illumination variant to a display to illuminate the environment, the second frame to produce a bright area on the display.

17. The non-transitory computer-readable storage medium of claim 14, wherein the instructions further configure the computing device to:
   monitor a display;
   determine that the display is outputting a first video frame providing the first illumination variant; and
   determine that the display is outputting a second video frame providing the second illumination variant.

18. A non-transitory computer-readable storage medium storing processor-executable instructions for controlling a computing device, the instructions to configure the computing device to:
   select a first image of a portion of an environment within a field-of-view of a camera as the portion of the environment is illuminated with a first illumination variant, the first illumination variant illuminating the environment at a first angle;
   select a second image of the portion of the environment within the field-of-view of the camera as the portion of the environment is illuminated with a second illumination variant, the second illumination variant illuminating the environment at a second angle that is different from the first angle of the first illumination variant;
   identify a first region that exhibits a first luminance in the first image and exhibits a second luminance in the second image, a first difference between the first luminance and the second luminance exceeding a threshold value;
   determine that the first region includes a specular surface based on the first difference exceeding the threshold value;
   receive video content;
   output the video content to a display;
   monitor the display;
   determine that the display is outputting a first video frame providing the first illumination variant;

select the first video frame based on differences in contrast between areas of the first video frame exceeding a contrast threshold, the first video frame including a first bright area on a first portion of the first video frame and a first dark area on a second portion of the first video frame;

determine that the display is outputting a second video frame providing the second illumination variant; and select the second video frame based on differences in contrast between areas of the second video frame exceeding the contrast threshold, the second video frame including a second bright area on a second portion of the second video frame and a second dark area on a first portion of the second video frame.

19. A non-transitory computer-readable storage medium storing processor-executable instructions for controlling a computing device, the instructions to configure the computing device to:

select a first image of a portion of an environment within a field-of-view of a camera as the portion of the environment is illuminated with a first illumination variant, the first illumination variant illuminating the environment at a first angle;

select a second image of the portion of the environment within the field-of-view of the camera as the portion of the environment is illuminated with a second illumination variant, the second illumination variant illuminating the environment at a second angle that is different from the first angle of the first illumination variant;

identify a first region that exhibits a first luminance in the first image and exhibits a second luminance in the second image, a first difference between the first luminance and the second luminance exceeding a threshold value;

determine that the first region includes a specular surface based on the first difference exceeding the threshold value;

monitor a display;

determine that the display is outputting a first video frame providing the first illumination variant;

determine that the display is outputting a second video frame providing the second illumination variant; and locate the display by identifying a geometric area outputting a flickering luminance within the portion of the environment within the field-of-view of a camera.

20. A non-transitory computer-readable storage medium storing processor-executable instructions for controlling a computing device, the instructions to configure the computing device to:

select a first image of a portion of an environment within a field-of-view of a camera as the portion of the environment is illuminated with a first illumination variant, the first illumination variant illuminating the environment at a first angle;

select a second image of the portion of the environment within the field-of-view of the camera as the portion of the environment is illuminated with a second illumination variant, the second illumination variant illuminating the environment at a second angle that is different from the first angle of the first illumination variant;

identify a first region that exhibits a first luminance in the first image and exhibits a second luminance in the second image, a first difference between the first luminance and the second luminance exceeding a threshold value;

determine that the first region includes a specular surface based on the first difference exceeding the threshold value;

monitor a display;

determine that the display is outputting a first video frame providing the first illumination variant;

determine that the display is outputting a second video frame providing the second illumination variant;

identify first video content being output by the display; and access second video content corresponding to the first video content, a first source of the first video content and a second source of the second video content being different, wherein the instructions to determine that the display is outputting the first video frame configure the computing device to determine the first video frame based on the second video content, and the instructions to determine that the display is outputting the second video frame configure the computing device to determine the second video frame based on the second video content.

* * * * *